United States Patent Office.

ALBERT RUTTKAY, NEW YORK, N. Y.

Letters Patent No. 107,815, dated September 27, 1870.

IMPROVEMENT IN THE MANUFACTURE OF ASPHALTIC COMPOSITIONS FOR PAVEMENTS, ROADS, &c.

The Schedule referred to in these Letters Patent and making part of the same.

To all whom it may concern:

Be it known that I, ALBERT RUTTKAY, of the city, county, and State of New York, have invented a new and useful Improvement in Asphalt Compositions, of which the following is a specification.

Nature and Objects of the Invention.

The invention relates to a composition of particles of hard mineral or animal substance, broken or pulverized into particles of the proper size, and capable of being percolated by liquid or fluid matter, in combination with linseed-oil, and with or without litharge.

The object of the invention is to produce a composition capable of being formed into desired shapes, and then hardened and used in a manner similar to clay when burnt, or as a cement, or for making pavements or roadways, and for similar purposes.

General Description.

The invention consists of a composition of sand, gravel, screened or unscreened, chalk, lime, brick, broken or pulverized, or any other suitable substance, of sufficient tenacity and hardness, with linseed-oil, to which may be added litharge, if it be desired, to absorb the oil rapidly.

The following is a formula of the composition, giving the relative proportions used.

Four pounds gravel, coarse.
One and one-half pounds chalk.
Three-sixteenths pound boiled linseed-oil.
One-sixteeth pound litharge.

The above ingredients are placed in a vessel, and thoroughly intermixed. The product may then be deposited in molds, or rolled into sheets, or placed on any substance desired to be coated with the composition to such thickness as may be desired. When thus placed, the material will harden into a compact mass, so that it will be impervious to water.

The ingredient common to the invention is linseed-oil. When it is desired to render the composition, when hardened, more compact, the relative quantity of oil in the intermixture should be increased.

The litharge is employed to absorb the oil, thus allowing the composition to dry and harden with greater rapidity. Its use is optional in the preparation of the admixture.

The formula above, or one embracing about the same ingredients, is suitable for use upon streets and pavements, in which use the ground is first cleared of loose earth, its surface being conformed to the desired shape. The composition, in a soft condition, is then spread over it evenly, and allowed to harden. The composition may likewise be superposed on wood, stone, iron, brick, or composition paving.

In preparing the composition for use as a stucco or roofing, the larger particles of material should be carefully excluded when it may be applied to the wall or roof, in the usual manner, in which position it will harden.

For foot-pavements, the above formula may be taken, except that a material composed of smaller particles than coarse gravel should be used in its stead. This variety of the composition is proper for the manufacture of articles usually made of clay; and, also, when in its soft condition, may be used as a cement or mortar.

The invention, when in its hardened state, cannot be disintegrated by heat, and is not affected by boiling water.

The composition may be colored by the use of colored ingredients.

Claim.

What I claim as my invention, and desire to secure by Letters Patent, is—

The composition of gravel, or broken and pulverized stone mixed, litharge, chalk, and linseed-oil, as herein set forth, for a paving or roofing-material.

In testimony that I claim the foregoing invention of asphalt composition, as above described, I have hereunto set my hand and seal this 1st day of September, 1870.

ALBERT RUTTKAY. [L. S.]

Witnesses:
EDM. F. BROWN.
ROBT. J. FLEMING.